United States Patent [19]
Go et al.

[11] 3,942,997
[45] Mar. 9, 1976

[54] PAINT COMPOSITIONS CONTAINING LIQUID POLYMERS

[75] Inventors: Tadahiro Go; Hiroshi Yaginuma; Masaaki Inoue, all of Kawasaki, Japan

[73] Assignee: Nippon Zeon Co., Ltd., Tokyo, Japan

[22] Filed: Nov. 11, 1974

[21] Appl. No.: 522,382

Related U.S. Application Data

[62] Division of Ser. No. 375,102, June 29, 1973, Pat. No. 3,884,712.

[30] Foreign Application Priority Data

July 5, 1972 Japan................................. 47-67411

[52] U.S. Cl. ........................... 106/285; 260/94.2 M
[51] Int. Cl.² .......................................... C09D 3/48
[58] Field of Search ........... 106/287, 285; 260/669, 260/94.2 W, 666 DQ

[56] References Cited
UNITED STATES PATENTS

| | | | |
|---|---|---|---|
| 2,631,175 | 3/1953 | Crouch | 260/94.2 M |
| 2,753,382 | 7/1956 | Hammer | 260/666 DQ |
| 2,780,664 | 2/1957 | Serniuk | 260/666 DQ |

*Primary Examiner*—Theodore Morris
*Attorney, Agent, or Firm*—Frank J. Jordan

[57] ABSTRACT

Liquid polymers made predominantly of 1,3-pentadiene and 1,3-butadiene, which have a number average molecular weight of 300 – 10,000 and an iodine number of at least 250 and are capable of forming hydrocarbon solvent-insoluble coatings thereof; a process for preparing the liquid polymers; and paint compositions comprising the liquid polymer as the vehicle.

6 Claims, No Drawings

PAINT COMPOSITIONS CONTAINING LIQUID POLYMERS

This is a division, of application Ser. No. 375,102, filed June 29, 1973, now U.S. Pat. No. 3,884,712.

The present invention relates to novel liquid polymers and a process for preparing the same by copolymerizing 1,3 pentadiene and 1,3-butadiene, together with or without other olefins. More particularly it relates to a process for the preparation of liquid polymers capable of forming hydrocarbon solvent-insoluble coatings thereof by copolymerizing at least about 80% by weight of a monomeric mixture of 90 – 50 parts by weight of 1,3-pentadiene and 10 – 50 parts by weight of 1,3-butadiene, together with or without up to about 20% by weight of other olefins, in the presence of a homogenizable Fridel-Crafts type catalyst.

Many studies have long been made on processes for the cationic polymerization of unsaturated hydrocarbons using a Friedel-Crafts type catalyst, and it is known that a polymer may be obtained in rubbery, resinous, liquid, gel-like or any other desired form by the suitable selection of polymerization conditions such as a catalyst used and a combination of monomers used. Typical of such a polymer is a polyisobutylene, petroleum resin or the like. Studies of cationic polymerization have recently been resumed in one of attempts to make effective use of fractions which are increasingly produced as by-products, as ethylene plants are enlarged in scale.

It is known that a $C_5$ fraction containing a large proportion of 1,3-pentadiene is polymerized in the presence of a homogenizable Friedel-Crafts type catalyst such as, for example, boron trifluoride to obtain a liquid polymer (U.S. Pat. No. 2,753,382). It is also known that 1,3-pentadiene is polymerized in the presence of alkylaluminum dichloride to a liquid polypentadiene (U.S. Pat. No. 3,446,765). The polymers obtained by these known processes have been considered useful as a synthetic drying oil chiefly for paints. In the course of their intense studies of liquid polypentadienes, on the other hand, the present inventors have found that liquid polypentadienes produced by cationic polymerization have superior properties as vehicle and, on the contrary, have several disadvantages. More particularly, paints containing such liquid polypentadienes are excellent in luster retention, levelling property, yellowing and other properties as compared with those containing other polymers such as alkyd resins and, in addition, they can extremely easily addition react with an unsaturated carboxylic acid such as maleic anhydride and will make an electrophoretic paint remarkably superior in throwing power when used in the paint. However, such paint is vitally disadvantageous in that coatings formed thereof are soluble in hydrocarbon solvents and are therefore remarkably inferior in solvent resistance. Further, liquid 1,2-polybutadienes already put on the market can be used for paints and they can be cured with a peroxide to obtain polybutadiene resins which are used in the production of, for example, molded and cast articles therefrom, whereas liquid polypentadienes are unexpectedly difficult to cure and practically impossible to use in these molding and casting fields.

The present inventors have made intence studies in an attempt to eliminate said drawbacks of conventional liquid polypentadiene and, as the result of their studies, have found that polymers obtained by the copolymerization of 1,3-pentadiene and 1,3-butadiene have very excellent properties. The present invention is based on this finding or discovery.

An object of the present invention is to provide a process for the preparation of liquid polymers capable of forming hydrocarbon solvent-insoluble coatings and being cured with a peroxide.

Another object of the present invention is to provide liquid polymers capable of forming hydrocarbon solvent-insoluble coatings.

Still another object of the present invention is to provide a paint composition comprising the liquid polymer as the vehicle.

The process of the present invention comprises subjecting a monomeric mixture of 1,3-pentadiene and 1,3-butadiene, together with or without other olefins, to cationic polymerization and more particularly copolymerizing at least about 80% by weight of a monomeric mixture containing 90 – 50 parts by weight of 1,3-pentadiene and 10 – 50 parts by weight of 1,3-butadiene, together with or without up to about 20% by weight of other olefins, in the presence of a "homogenizable" Friedel-Crafts type catalyst to obtain the desired liquid polymers.

By the term homogenizable used herein is meant gaseous, liquid, or solvent soluble.

As previously mentioned, the starting material according to the present invention is preferably a monomeric mixture of 90 – 50% by weight of 1,3-pentadiene and 10 – 50% by weight of 1,3-butadiene. The monomeric mixture may partly be substituted by other olefins having from 4 to 5 carbon atoms such as butene-1, isobutene, pentene-1, 2-methylbutene-1, 2-methylbutene-2, isoprene and cyclopentene, as far as the resulting new mixture retains 1,3-pentadiene and 1,3-butadiene in the ratios by weight of from 90 : 10 to 50 : 50. Since the higher the 1,3-pentadiene and 1,3-butadiene content of the resulting new mixture is, the better the result obtained is, the content of the other olefins of the new mixture should not exceed approximately 20% by weight, preferably approximately 10% by weight. It is known that gel-like polymers are obtained by cationically polymerizing 1,3-butadiene in the presence of a homogenizable Friedel-Crafts type catalyst. In such case, if 1,3-butadiene is used in amounts of not more than 50% by weight of total monomers used as in the process of the present invention, then liquid polymers containing no or little gel will unexpectedly be obtained; whereas the use of 1,3-butadiene in amounts of less than 10% by weight will give polymers which are not capable of forming hydrocarbon solvent-insoluble coatings nor being cured with a peroxide. The use of a combination of 1,3-pentadiene and 1,3-butadiene is an important constituent of the present invention. If the 1,3 -butadiene is substituted by isoprene, which is a conjugated diene like 1,3-butadiene, the object of the present invention will not be attained. In addition, it is not recommendable to use other olefins than 1,3-pentadiene and 1,3-butadiene in amounts of more than about 20% by weight of the total monomers since, in this case, there can be obtained no polymer which is capable of forming coatings insoluble in hydrocarbon solvents.

The catalysts which may be used in the practice of the present invention, are homogenizable Friedel-Crafts type catalysts. Examples of the catalysts include boron trifluoride and its complexes, stannic tetrachloride, ferric chloride, titenic tetrachloride, solubilized aluminum chlorides, alkylaluminum dichloride, sulphuric acid and hydrogen fluoride. Particularly boron trifluoride and its complexes are preferable, but the catalysts should not be limited to these ones. The homogenizable catalysts as exemplified above will give liquid polymers when used as the catalyst in polymerizing 1,3-pentadiene. Since the use of non-homogenizable Fridel-Crafts type catalysts such as aluminum chloride and bromide, gives resinous polymers, they should be excluded from the catalysts which may be used in the practice of the present invention.

In practicing the present invention the amounts of catalyst used may vary depending on, for example, the kind thereof and are therefore not limitative; however, they may conveniently be in the range of 0.05 – 5% by weight of monomers used.

According to the present invention, the polymerization is effected in the presence or absence of an inert hydrocarbon solvent at temperatures of from −80° to 150° C, preferably 0° to 100° C. Hydrocarbons which may be used as the solvent, include usually used aliphatic, alicyclic and aromatic hydrocarbons, such as butane, pentane, hexane, cyclohexane, benzene, toluene and xylene. The materials such as monomers and catalyst, may be added to the polymerization system in any optional order; for example, the catalyst or monomers may intermittently or continuously be added, or these materials may be charged at a time before the start of the polymerization. The reaction products are subjected to a known technique such as filtration, treatment with active clay, or washing with methanol, aqueous methanol or a mixture of methanol and hydrochloric acid, to remove the used catalyst therefrom. Using known techniques, the catalyst-free reaction products are further freed of the unreacted monomers, used solvent and produced low molecular polymers and are then dried to obtain desired liquid polymers. The polymers so obtained have a number average molecular weight of 300 – 10,000, preferably 500 – 3,000, as determined from Vapor Pressure Osmometer (VPO), and an iodine number of not less than 250 as determined from Wijs method, and they vary in form from low viscous, liquid polymer to extremely highly viscous, liquid polymer.

The liquid polymers obtained according to the present invention may be modified using known techniques. For example, they may be epoxidized, halogenated or addition reacted with α,β-unsaturated dicarboxylic acid derivatives such as maleic anhydride. With aid of the air or oxygen, the original or thus-modified polymers are capable of forming coatings or films which are insoluble in a hydrocarbon solvent such as hexane, heptane, benzene, toluene or xylene. These polymers are very useful as a vehicle for paints remarkably improved in solvent-resistant property in which conventional polybutadienes are deficient as their vital defect. The liquid polymers according to the present invention may be used in admixture with natural drying oils such as linseed oil, tung oil and soybean oil, and with synthetic drying oils such as alkyd resins, liquid cis-polybutadienes and liquid 1,2-polybutadienes. In addition, they may be cured by heating with known peroxides such as cumene hydroperoxide, dicumyl perioxide, benzoyl peroxide and t.-butyl peroxide. They may also be incorporated with ethylenically unsaturated monomers such as styrene, α-methylstyrene, vinyltoluene, methyl methacrylate and divinylbenzene, and/or with plasticizers such as ethyl fumarate and diallyl phthalate, as diluents.

The liquid polymers according to the present invention may, as desired, be incorporated with conventional driers, fillers, pigments, and other additives for use not only as air-drying or baking paints or water paints but as material for inks, binders, sealants, molded or cast articles.

The present invention will be better understood by the following examples.

EXAMPLES 1 – 4

In each of Examples, a 160-ml pressure glass reactor was purged with nitrogen and then charged with 40g of the monomers mixed in the ratio indicated in the following Table 1 and with 16g of n-pentane to form a mixture which is thoroughly mixed, incorporated with 0.8g of boron trifluoride diethyl etherate and then subjected to polymerization at 30° C for 2 hours. The polymerization was terminated by adding 5 ml of acetone to the reaction system, and the reaction products were dried at a temperature of 60° C and reduced pressure of 1mm Hg for two hours thereby obtaining a brown-colored liquid polymer the yield, gel content and iodine number of which are shown in Table 1. The yield is represented by the ratio by weight of the polymer obtained to the total monomers used; the gel content, by the ratio by weight between the portion of the polymer left on a 80-mesh wire net when passing therethrough a liquid of the polymer in toluene the volume of which was 10 times that of the polymer, and the polymer; and the Iodine number determined by the test according to JIS (Japanese Industrial Standard) K-5400 based on Wijs method.

For comparison, in each of Comparative Examples the same procedure as in Examples 1 to 4 was followed with the exception that the mixing ratio of the monomers used was not in the range according to the present invention.

The results are indicated in Table 1.

Table 1

|  | Comparative Examples | | | Examples | | | |
| --- | --- | --- | --- | --- | --- | --- | --- |
|  | 1 | 2 | 3 | 1 | 2 | 3 | 4 |
| 1,3-pentadiene used (wt.%) | 100 | 95 | 25 | 85 | 75 | 65 | 55 |
| 1,3-butadiene used (wt.%) | — | 5 | 75 | 15 | 25 | 35 | 45 |
| Yield of polymer obtained (%) | 100 | 96 | 70 | 99 | 98 | 89 | 75 |
| Gel content (wt.%) | 0.6 | 0.4 | 26.1 | 1.2 | 0.9 | 1.3 | 1.5 |
| Iodine number | 270 | 273 | — | 289 | 306 | 321 | 282 |

The Table shows that the gel content remarkably increases with the increase in amount of 1,3-butadiene used. (Experiment 1)

19 hundred parts by weight of each of the liquid polymers obtained in Comparative Examples 1-1 and Examples 1 - 4 were incorporated with 30 parts by weight of toluene, 0.1 part by weight of cobalt naphthenate (as cobalt metal) and 0.9 parts by weight of lead naphthenate (as lead metal) to form a mixture which was thoroughly blended and coated on the thoroughly degreased, dried test glass plates using a 100 $\mu$ applicator, and allowed to stand in an incubator kept at a temperature of 20° C and a relative humidity of 65% for 10 days, thereby obtaining air-dried coatings. The coatings so obtained were measured for their thickness, and the glass plates with the coating formed thereon were immersed in toluene at 20° C for 1 hour to investigate how the solvent resisting property or solvent resistance of the coatings was. The results are indicated in Table 2.

Table 2

|  | Comparative Examples | | Examples | | | |
|---|---|---|---|---|---|---|
|  | 1 | 2 | 1 | 2 | 3 | 4 |
| Thickness of coating ($\mu$) | 19 | 22 | 20 | 21 | 17 | 20 |
| Solvent resistance | X | X | O | O | O | O |

X : Unsatisfactory
O : Excellent

Table 3

|  | Comparative Examples | | Examples | | | |
|---|---|---|---|---|---|---|
|  | 1 | 2 | 1 | 2 | 3 | 4 |
| Thickness of coating ($\mu$) | 19 | 22 | 18 | 24 | 20 | 23 |
| Solvent resistance | X | X | O | O | O | O |

X : Unsatisfactory
O : Excellent

When immersed in toluene, the coatings obtained from the liquid polymers of Comparative Examples 1 to 2 were completely dissolved therein.

EXAMPLE 5 – 8

Seventy parts by weight of linseed oil (previously boiled) were mixed with 30 parts by weight of each of the liquid polymers of Comparative Examples 1 to 2 and Examples 1 to 4. Each of the resulting mixtures was treated in quite the same manner as in the Examples 1 to 4 to form an air-dried coating which was tested, in accordance with JIS K-5400, for its performance as a coating. For comparison, simply linseed oil was treated as above to form an air-dried (this term meaning "dried at room temperatures such as 20° C" throughout the specification) coating which was then tested as above. The results are shown in Table 4.

Table 4

|  | Comparative Examples | | | Examples | | | |
|---|---|---|---|---|---|---|---|
|  | 4 | 5 | 6 | 5 | 6 | 7 | 8 |
| Material used | Linseed oil | Linseed oil + Polymer of Comp.Ex.1 | Linseed oil + Polymer of Comp.Ex.1 | Linseed oil + Polymer of Ex.1 | Linseed oil + Polymer of Ex.2 | Linseed oil + Polymer of Ex.3 | Linseed oil + Polymer of Ex.4 |
| Set to touch (hour) | 3 | 3 | 3 | 3 | 3 | 4 | 4 |
| Dust free (hour) | 5 | 5 | 5 | 5 | 6 | 6 | 6 |
| Thickness of coating ($\mu$) | 25 | 24 | 19 | 27 | 21 | 21 | 26 |
| Solvent resisting property *1 | Δ | Δ | Δ | O | O | O | O |
| Water-proof property *2 | X | X | X | O | O | O | O |
| Alkalinity resistance *3 | X | O | O | O | O | O | O |
| Erichsen | 9.2 | 7.9 | 7.7 | 8.9 | 9.1 | 9.3 | 8.6 |
| Impact resistance *4 | O | X | X | O | O | O | O |
| Pencil hardness | 5B | B | B | HB | F | F | F |

*1 Immersed in toluene at 20°C for 30 minutes
*2 Immersed in water at 20°C for one hour
*3 Immersed in a 3% aqueous solution of NaOH at 20°C
*4 Du Pont Impact strength ½ inch × 1 kg × 50 cm The air-dried coatings obtained from the liquid polymers of Comparative Examples 1 and 2 were completely dissolved in the toluene, indicating that they were markedly inferior in solvent resisting property, while those obtained from the liquid polymers of Examples 1 to 4 were remarkably improved in said property substantially without crimping, checking and blistering appreciated therein.

(EXPERIMENT 2)

Then, each of the liquid polymers obtained in Comparative Examples 1 - 2 and Examples 1 - 4 was coated on previously thoroughly degreased and dried test plates using a "100$\mu$" applicator and baked at 180° C for 30 minutes to obtain baked coatings. The coatings thus obtained were measured for their thickness and then tested for their solvent resistance by immersing in toluene at 20° C for 1 hour. The results are shown in Table 3.

Table 4 shows that if linseed oil is used in admixture of the polymer according to the present invention as a vehicle of paint then the mixture will give paint which is improved in water and alkali resistances although said oil alone was originally inferior in said resistances.

COMPARATIVE EXAMPLES 4 – 6

In each of these Comparative Examples the procedure of Example 1 was followed, but using 1,3-pentadiene and isoprene in the amounts indicated in Table 5, to obtain a liquid 1,3-pentadiene/isoprene copolymer. The copolymers so obtained were baked in the same manner as in Experiment 2 of Example 1 to form baked coatings which were then immersed in toluene at 20° C for 1 hour to investigate their solvent resistance. The results are indicated in Table 5.

Table 5

|  | Comparative Examples | | |
|---|---|---|---|
|  | 4 | 5 | 6 |
| 1,3-pentadiene (wt.%) | 85 | 70 | 55 |

Table 5-continued

|  | Comparative Examples | | |
|---|---|---|---|
|  | 4 | 5 | 6 |
| isoprene (wt.%) | 15 | 30 | 45 |
| Yield (%) | 100 | 100 | 100 |
| Solvent resistance | x | x | x | x : Unsatisfactory

The baked coatings obtained from the 1,3-pentadiene/isoprene copolymers were completely dissolved in the toluene when immersed therein. This indicates that the use of 1,3-butadiene in certain proportions is indispensable for obtaining liquid polymers according to the present invention.

COMPARATIVE EXAMPLE 7

The procedure of Example 1 was followed, but using as the monomers 1,3-pentadiene, 1,3-butadiene and other olefins in the amounts as indicated in Table 6. The copolymer thus produced was treated in the same manner as in Experiment 2 of Example 1 to obtain baked coatings which were then immersed in toluene at 20° C for 1 hour to investigate their solvent resistance. The result is shown in Table 6.

Table 6

| 1,3-pentadiene (wt.%) | 55 |
|---|---|
| 1,3-butadiene (wt.%) | 20 |
| 1-pentene (wt.%) | 15 |
| Isoprene (wt.%) | 10 |
| Yield (%) | 93 |
| Solvent resistance | x | x : Unsatisfactory

The baked coatings obtained from this copolymer had considerably better solvent resistance than those obtained from the polymer of Comparative Example 1 but were not fully satisfactory with some crimples, checks and blisters created therein.

EXPERIMENT 3

Seventy parts by weight of the polymer obtained in Example 1 were incorporated with 30 parts by weight of styrene and then with 8 parts by weight of dicumyl peroxide. The resulting mixture was heat treated at 150° C for 10 hours to thereby obtain a completely cured polymer which was so hard that a 1-mm diameter wire could not penetrate it.

For comparison, a test was made. In this test, the procedure of Experiment 3 was followed except that the liquid polymer of Example 1 was substituted by that of Comparative Example 1. The solid mass so obtained was the one which was melting at temperatures of not higher than 40° C and liable to be deformed even at room temperatures.

From the above it is seen that the liquid polymers according to the present invention may be used in the production of cured moldings.

What is claimed is:

1. A paint composition comprising a pigment and as a vehicle a liquid polymer of 90 – 50% by weight comprising 1,3-pentadiene and 10 – 50% by weight of 1,3-butadiene, the polymer having a number average molecular weight of 300 – 10,000 and an iodine number of at least 250 and being capable of forming hydrocarbon solvent-insoluble coatings.

2. A paint composition comprising a pigment and as a vehicle a liquid polymer of (A) at least 80% by weight comprising a mixture of 90 – 50 parts by weight of 1,3-pentadiene and 10 – 50 parts by weight of 1,3-butadiene and (B) up to 20% by weight of at least one member selected from the group consisting of butene-1, isobutene, pentene-1, 2-methylbutene-1, 2-methylbutene-2, isoprene and cyclopentene, the polymer having a number average molecular weight of 300 – 10,000 and an iodine number of at least 250 and being capable of forming hydrocarbon solvent-insoluble coatings.

3. A paint composition comprising a pigment and as a vehicle a liquid polymer of (A) at least 90% by weight comprising a mixture of 90 – 50 parts by weight of 1,3-pentadiene and 10 – 50 parts by weight of 1,3-butadiene and (B) up to 10% by weight of at least one member selected from the group consisting of butene-1, isobutene, pentene-1, 2-methylbutene-1, 2-methylbutene-2, isoprene and cyclopentene, the polymer having a number average molecular weight of 300 – 10,000 and an iodine number of at least 250 and being capable of forming hydrocarbon solvent-insoluble coatings.

4. A paint composition according to claim 1, in which the liquid polymer is the product of the copolymerization of the 1,3-pentadiene and the 1,3-butadiene in the presence of a homogeneous Friedel-Crafts type catalyst.

5. A paint composition according to claim 2, in which the liquid polymer is the product of the copolymerization of the 1,3-pentadiene and the 1,3-butadiene in the presence of a homogeneous Friedel-Crafts type catalyst.

6. A paint composition according to claim 3, in which the liquid polymer is the product of the copolymerization of the 1,3-pentadiene and the 1,3-butadiene in the presence of a homogeneous Friedel-Crafts type catalyst.

* * * * *